INVENTOR.
BURTON H. MARSHALL

INVENTOR.
BURTON H. MARSHALL

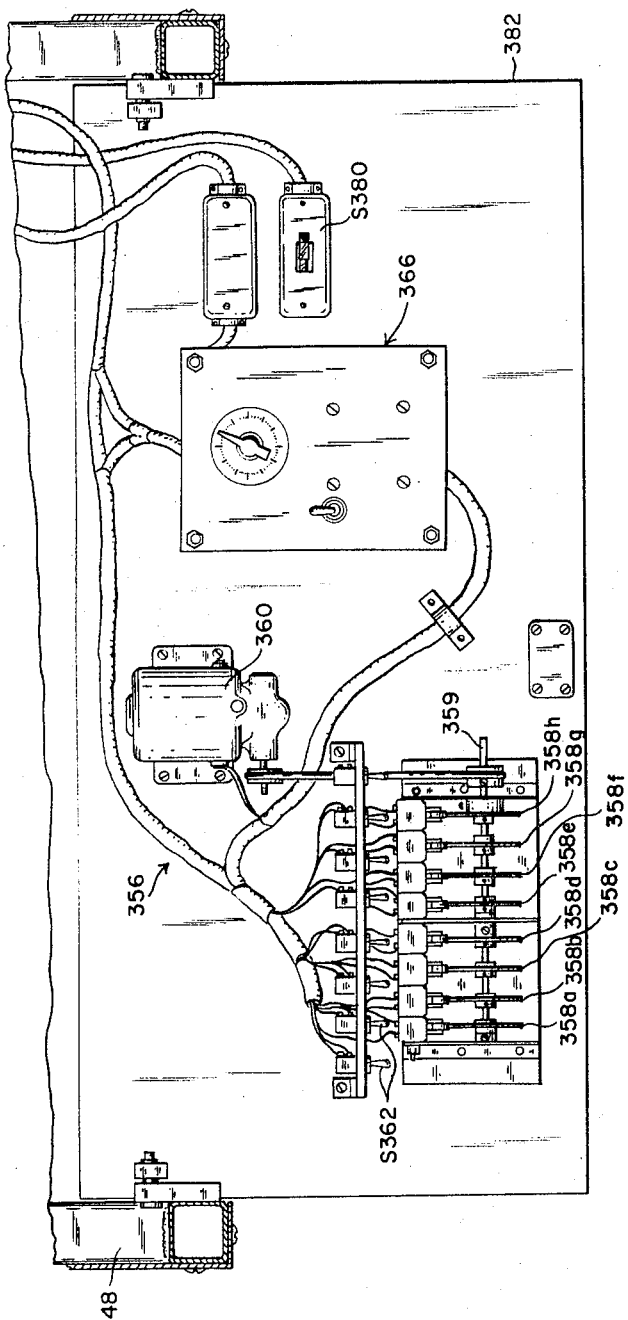
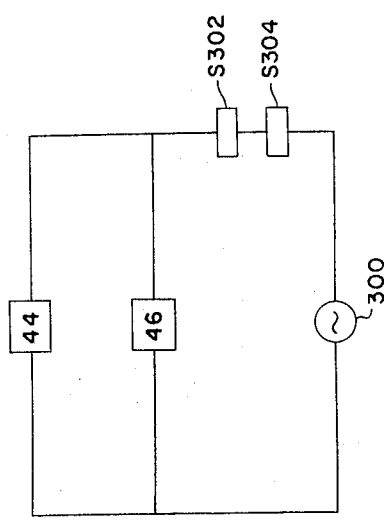
FIG. 4
FIG. 16
INVENTOR.
BURTON H. MARSHALL

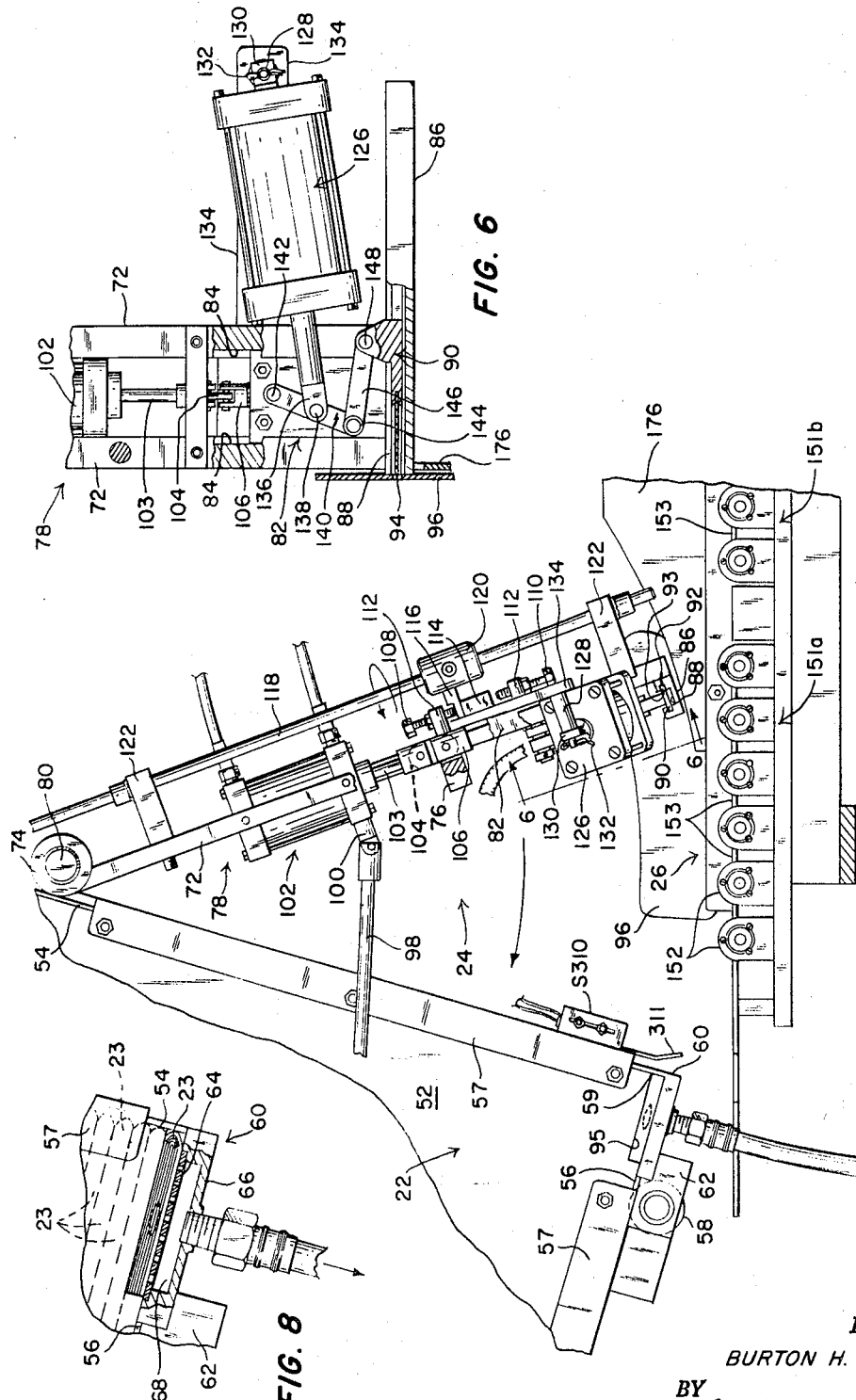

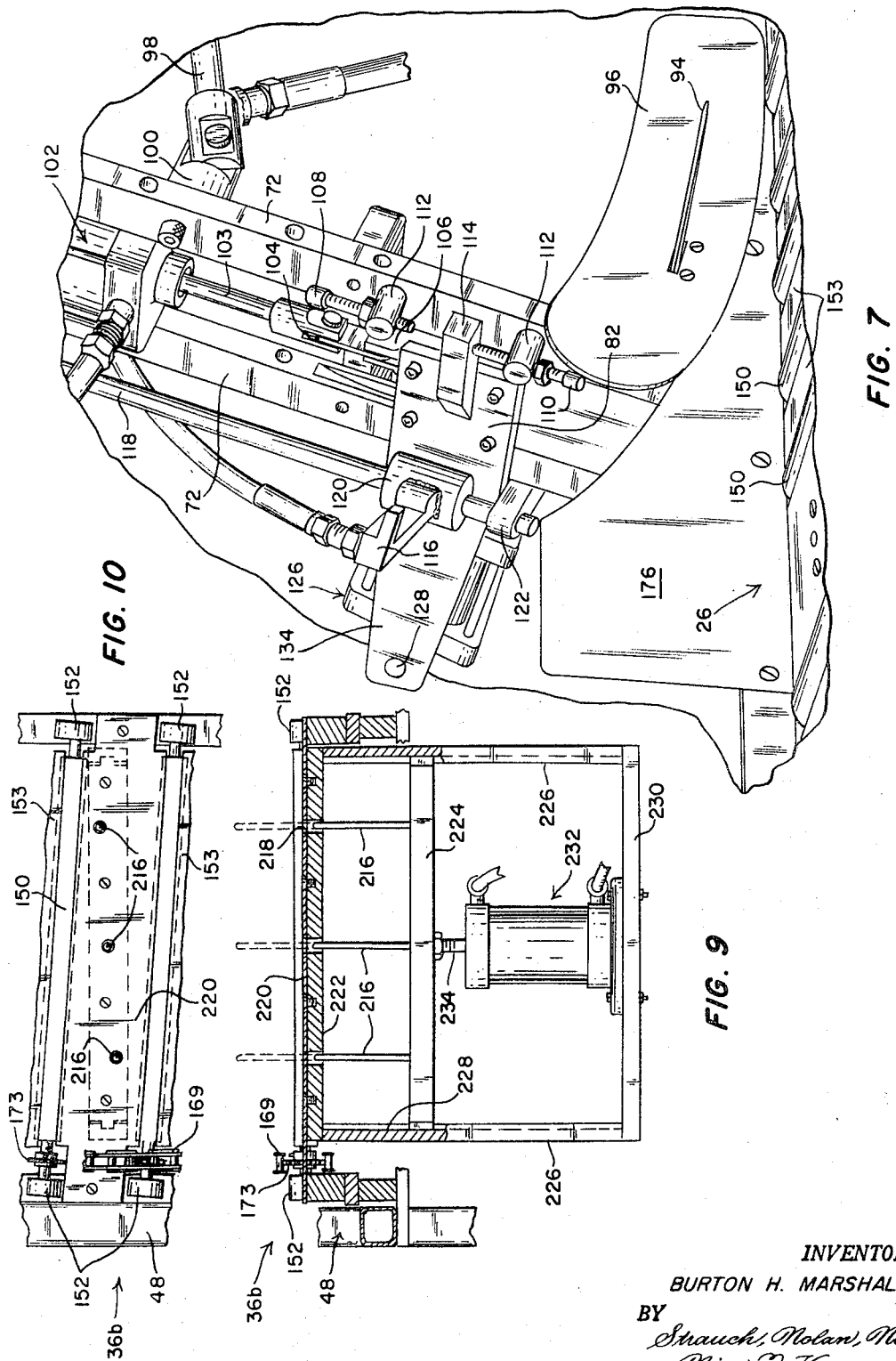

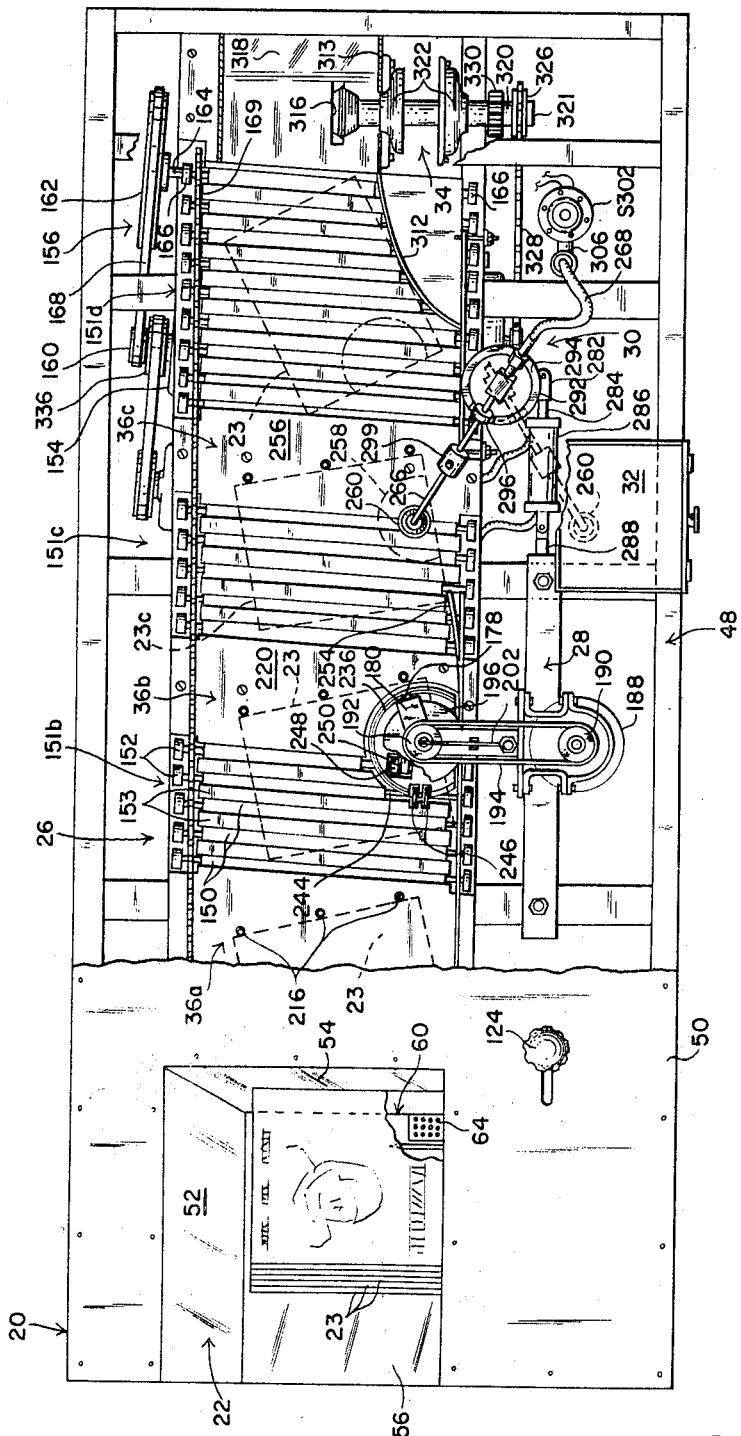

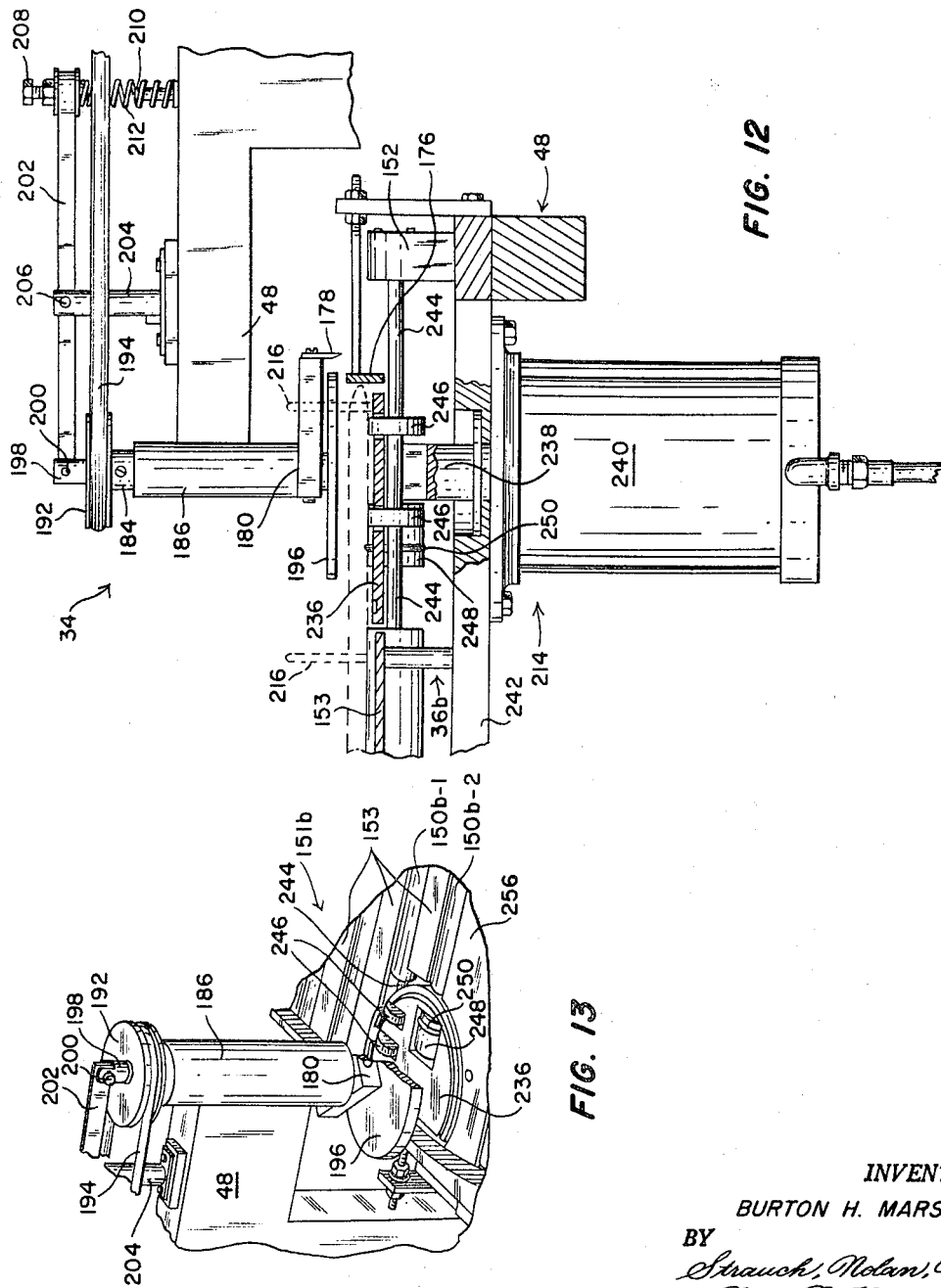

INVENTOR.
BURTON H. MARSHALL
ATTORNEYS

United States Patent Office 3,431,805
Patented Mar. 11, 1969

3,431,805
MAGAZINE COUNTING AND DESTROYING APPARATUS
Burton H. Marshall, Accord, N.Y., assignor to Canyon Research Corporation, Accord, N.Y., a corporation of New York
Continuation of application Ser. No. 655,822, July 25, 1967. This application May 8, 1968, Ser. No. 727,745
U.S. Cl. 83—103                                  17 Claims
Int. Cl. B26d 7/06, 7/28, 7/18

ABSTRACT OF THE DISCLOSURE

Apparatus for automatically severing and separating coupons from magazines and the like and for mutilating the magazines to make them essentially unreadable. A picker member moves the magazines from a hopper onto a conveyor which carries the magazines to stations where the coupons are cut from the magazine covers and removed and the magazines mutilated. Registers are actuated as the magazines are removed from the hopper and as the coupons are removed from the magazines to provide a count on the number of magazines processed and a check.

---

This application is a continuation of application Ser. No. 655,822, July 25, 1967, now abandoned.

Background, summary and objects of the invention

This invention relates to novel apparatus capable of automatically cutting coupons or banners from the covers of magazines, collecting and counting the coupons, and mutilating the magazines to make them essentially unreadable.

In this country, most magazines [1] are sold on consignment with the distributors receiving credit for unsold copies when the publication involved becomes outdated. Because of the shipping costs involved, unsold copies are customarily not returned to the publisher. Instead, the dealer normally returns only an identifying portion of the front cover of the publication (hereinafter referred to as a "coupon" or "banner") as evidence that the copy has not been sold. The magazines are then destroyed to prevent their resale on the secondhand market and sold as scrap paper.

In the past, the steps just described have been carried out almost entirely manually with hand labor being employed to remove and count the coupons and to feed the magazines into a shredder or other device for destroying them. This is of course relatively expensive and, in large part, offsets the credit which the distributor receives for the unsold item.

To reduce the amount of hand labor required, one type of "magazine stripping machine," disclosed in U.S. Patent No. 2,618,334 to C. A. Cobb, has been proposed. This machine however, has a number of disadvantages.

First, the continual attention of an operator is required since the magazines being processed must be fed individually into the machine and an operating mechanism must be actuated by the attendent to initiate the processing of each magazine. A further, related disadvantage of this machine is that the rate of processing is quite slow due to the necessity of individually positioning each magazine at the feed end of the machine before the operating mechanism is actuated. Accordingly, it is virtually as expensive to process magazines with this machine as it is to process them manually.

Yet another disadvantage of this previously proposed machine is that a number of adjustments must be made each time magazines of different sizes and thicknesses are processed. Since the normal distributor handles a

[1] The term "magazines" as employed herein is intended to embrace both periodicals and other soft cover items such as comic books, paperback books, brochures, and the like.

large number of different magazines, the time spent in making these adjustments can become so great as to completely negate any benefits the machine is capable of providing.

Additional disadvantages of the above-described prior art machine are that the counting device for the coupons is advanced by the actuation of the coupon cutting mechanism and not by the actual transfer of the severed coupon to a collection receptacle and that there is no check on the counting device. Therefore, the total shown by the counting device may not reflect the number of coupons actually collected.

I have now invented and developed a novel, improved machine in which the deficiences of the prior art machines have been eliminated for accomplishing all of the steps necessary to separate coupons from magazine covers, collect and count the coupons, and destroy the magazines. Generally speaking, this novel machine includes an automatic, cyclically operating pick mechanism for removing the bottom one of a stack of magazines from a feed hopper and transferring it to a continuously operating conveyor. The conveyor conducts the magazine to a station where automatic stops and an automatic elevating mechanism move the magazine into operative relationship with a continuously operating cutter which severs the coupon or banner from the cover of the magazine.

The elevating mechanism and stops then retract, and the conveyor conducts the magazine, with the severed coupon still in place, to a second station where it is again halted by a system of automatically operating stops. At this station an automatic vacuum pickup removes the severed coupon and transfers it to a collection receptacle at which point a coupon counter is automatically advanced.

At this point the second stop assembly retracts, and the conveyor transfers the magazine to a third station where continuously operating knives destroy it.

One important feature of the present invention is that the processing of each magazine and all processing steps are automatically initiated and carried out. Therefore, the only hand labor involved is in supplying the magazines to the machine.

A related and also important feature of the novel machine described briefly in the preceding paragraphs is that it is not necessary to feed magazines individually into the machine. Instead, they are merely piled in the feed hopper. Also, since the pick mechanism removes the bottom magazine, this pile can be continuously replenished while the machine is operating. Both the elimination of hand feeding of individual magazines and the provision for replenishing the pile of magazines in the feed hopper during operation of the machine substantially increase the rate of operation over the type of prior art machine described above. In addition, these factors significantly reduce the amount of manual effort required in and the cost of processing a given number of magazines.

Another extremely important feature of the present invention is that it is capable of handling magazines of different sizes and thickness without adjustment. In fact, different size magazines can be readily handled even when intermingled in the feed hopper. This capability results both from the novel construction of the pick mechanism employed to remove the magazines from the feed hopper and that of the novel mechanism for elevating the magazines into cutting relationship to the coupon severing cutter. A novel conveyor system also contributes to the capability of the present invention to handle different sized magazines without adjustment.

Yet another important feature of the present invention is that the coupon counting mechanism is advanced only when a coupon is actually picked up and transferred to the collection receptacle. Accordingly, my novel invention is capable of providing a more accurate count of collected coupons than the type of prior art machine described above.

A further and related advantage of this invention is that a second counter is automatically actuated as each magazine is removed from the hopper to the conveyor mechanism. This counter accordingly provides a check on the coupon collection counter, insuring that the tally shown by the latter is accurate.

Yet another significant advantage of the invention is that it is relatively simple despite the number of operations which are automatically performed by it. Accordingly, its operation is virtually trouble free and, at the same time, it is relatively inexpensive to manufacture and to service. Service costs are further decreased by easy accessibility to the control components of the machine and the operating mechanism.

From the foregoing, it will be apparent that one important and primary object of the present invention is the provision of novel, improved machines for processing unsold magazines which are capable of cutting coupons from the covers of the magazines being processed, collecting and counting the coupons, and so mutilating the magazines as to make them essentially unreadable.

A related and also important object is the provision of such machines in which the amount of manual labor required is reduced to a minimum by automatic accomplishment of the steps described above and by a novel feed arrangement which permits the attendant both to simply stack the magazines being processed in a feed hopper rather than feeding them individually into the machine and to continuously replenish the stack while the machine is operating.

Still another important object of this invention resides in a provision of a novel, improved machine of the type described above which is capable of processing intermixed magazines of different sizes and thicknesses without adjustment.

A still further important object of the invention is the provision of such a machine in which the processing of each magazine is automatically initiated and the subsequent processing steps automatically carried out.

Yet another important object of the invention is such a machine in which severed coupons are counted only when they have been transferred to a collection receptacle and in which a second counter is advanced as each magazine is removed from the feed hopper to provide a check on the counter on which the number of coupons are registered.

A further important object of the invention is the provision of a novel, improved machine having the features described above which is economical to operate, trouble free, and relatively inexpensive to manufacture and to service.

Other important objects, further novel features, and additional significant advantages of the present invention will become apparent from the appended claims and as the ensuing detailed description and discussion proceeds in conjunction with the accompanying drawing.

*Brief description of the drawing*

In the drawing:

FIGURE 4 is a plan view of the machine's control panel;

FIGURE 5 is a side view, to an enlarged scale, of the feed end of the machine, included primarily to show in more detail the novel pick mechanism employed to remove the magazines from the feed hopper in which they are stacked and transfer them to the continuously operating conveyor which conducts them through the machine;

FIGURE 6 is a section through the pick mechanism, taken substantially along line 6—6 of FIGURE 5;

FIGURE 7 is a partial perspective of the pick mechanism;

FIGURE 8 is a partial section through the feed hopper showing a vacuum holding arrangement employed to maintain the magazines in the proper position while they are engaged by the pick mechanism;

FIGURE 9 is a partial vertical section through the machine, showing one of three identical, automatically operating stop assemblies employed to position the magazines in stationary positions as they are conveyed through the machine;

FIGURE 10 is a fragmentary plan view of the conveying mechanism and one of the stop assemblies;

FIGURE 11 is a plan view of the machine with its exterior casing broken away to show its operating components;

FIGURE 12 is a vertical section through the machine showing the details of the coupon severing mechanism and the novel elevating mechanism employed to raise the magazine being processed into operative relationship with the cutter mechanism;

FIGURE 13 is a fragmentary perspective of the machine intended to further illustrate the nature of the components shown in FIGURE 12;

FIGURE 16 is a wiring diagram for two coupon counting registers incorporated in the machine.

*Detailed description of an exemplary preferred embodiment*

Figure 1:
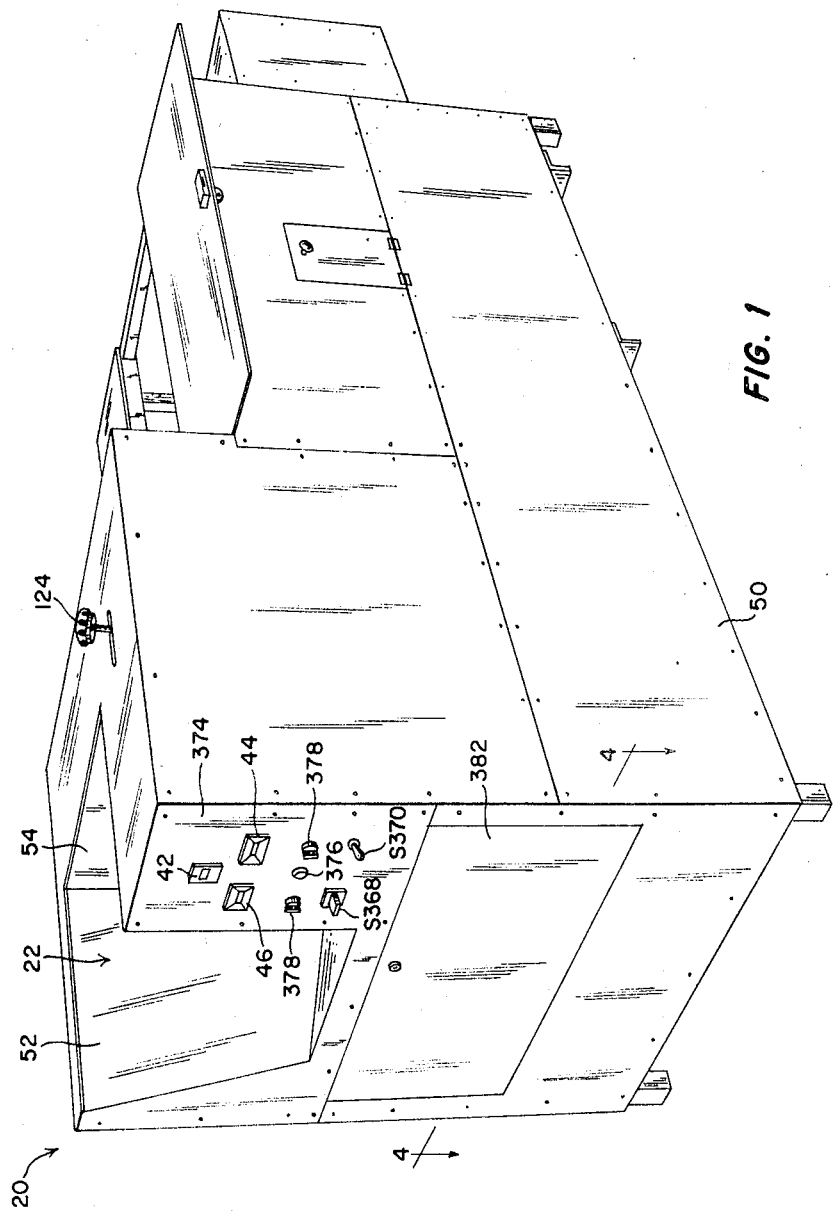
FIGURE 1 is a perspective view of a novel, improved magazine processing machine constructed in accord with the principles of the present invention.

Referring now to the drawing, FIGURE 1 depicts a novel magazine processing machine 20 constructed in accord with the principles of the present invention. The major components of machine 20, shown best in FIGURES 2 and 11, include a hopper 22 in which the magazines 23 to be processed are stacked, a cyclically operating pick mechanism 24 for removing magazines from hopper 22 and transferring them to a continuously operating conveyor 26, which conducts them through the machine, a coupon cutting mechanism 28 for severing coupons from the covers of the magazines being processed, a transfer mechanism 30 for picking up the severed coupons and transferring them to a collection receptacle 32, and a cutter mechanism 34 for destroying the magazines and making them unreadable. Other important components incorporated in the machine are automatically operating stop assemblies 36a–c which locate the magazines in fixed positions as they move through the machine, a vacuum system 38 by which various operating components of the machine are actuated, and a control system 40 (see FIGURE 14) for producing cyclic and automatic operation of the machine together with a counter 42 for registering the number of magazines removed from feed hopper 22 and co-operating, simultaneously actuated, resettable and nonresettable counters 44 and 46 on which the number of collected coupons are registered. The foregoing components are supported from a structural framework identified generally by reference character 48 to which sheet metal panels 50 are attached to enclose the operating mechanism. As shown in FIGURE 1, a number of these are hinged to framework 48 to permit ready access to the operating mechanism and control system.

The feed hopper 22 in which the magazines to be processed are stacked has side walls 52, a front wall 54, and a bottom or floor 56 all of sheet metal or similar construction. These members are tied together and stiffened by structural members 57.

Magazines which are to be processed are stacked in the forward right-hand corner of the machine with their bindings abutting the front wall of the hopper. To facilitate the location and retention of the magazines in this position the floor 56 of the hopper is sloped downwardly toward the front wall of the hopper. A transversely extending roller 58 mounted below hopper floor 56 extends through and slightly above the floor to facilitate the movement of magazines into engagement with the front wall of the hopper.

Pick mechanism 24 removes the magazines from hopper 22 through an opening 59 in floor 56 adjacent front wall 54 of the hopper. Opening 59 is normally covered by a door 60 which is fixed to hopper floor 56 by hinges 62. A spring 63 (see FIGURE 3) connected between the hopper and door 60 biases the door to the closed position shown in FIGURES 5 and 8 in which it abuts the lower edge of hopper front wall 54.

As shown in FIGURE 8, door 60 includes an apertured upper plate 64 against which magazines 23 rest and an imperforate lower portion 66 which define a plenum 68 in the door.

During operation of machine 20, a vacuum is produced in plenum 68 when there is a magazine on apertured door member 64. The magazine is accordingly pressed against the door to position it while it is engaged and displaced from hopper 22 by pick mechanism 24. As the magazine is withdrawn from the hopper the vacuum is released and then reapplied to engage the next magazine with the door member.

Referring now to FIGURES 2, 3, and 5–7, the novel pick mechanism 24 employed to remove magazines from hopper 22 and transfer them to conveyor 26 includes a pair of elongated guide members 72 connected by a tubular upper cross member 74 and a lower cross member 76 into a unitary support assembly 78. The support assembly is pivotally fixed to hopper 22 by a pivot member 80, which is fixed to the hopper and extends through upper cross member 74.

Mounted between the guide members 72 of the support assembly is a vertically displaceable slide 82. As best shown in FIGURE 7, the lateral edges of the slide fit in grooves 84 in guide members 72, thereby confining the slide to rectilinear movement in the guides.

Fixed to the lower end of slide 82 is a laterally extending guide member 86. A way 88 is formed in the upper surface of guide 86; and, as best shown in FIGURES 5 and 6, a pick member support 90 is slidably mounted in way 88. Lateral projections 92 on support 90 extend into grooves 93 formed in the sides of way 88 to confine the support to rectilinear movement in the guide. A thin, elongated, transversely oriented pick member 94 is fixed to the end of support 90.

In the operating cycle of pick mechanism 24, support assembly 78 is pivoted in a clockwise direction (as shown in FIGURE 5) about pivot member 80 until it is positioned opposite an opening 95 in the right-hand side wall 52 of hopper 22 above door 60. At the same time slide 82 is elevated to vertically align pick member 94 with this opening. Next, pick member support 90 is displaced from the retracted position of FIGURE 6 to the left, as shown in this figure. As support 90 moves to the left, pick member 94 extends through opening 95 and into the bottom magazine in the hopper.

As pick member 94 slides into the magazine, support assembly 78 is pivoted in a counterclockwise direction as shown in FIGURE 5, moving the pick member forwardly to engage the binding of the magazine 23 into which it is inserted. At the same time, slide 82 is moved downwardly in guides 72, causing the pick member to pivot door 60 to its open position. As the downward and counterclockwise movement is continued, the pick member pulls the magazine 23 down through the opening 59 in the floor 56 of hopper 22.

Pick member support 90 is then moved to the right to the position shown in FIGURE 6, withdrawing the pick member from magazine 23 and allowing the magazine to drop onto conveyor 26 with a longitudinally extending guide 96 fixed to the end of guide member 86 directing the magazines onto the conveyor as they are dropped. The cycle is then repeated.

Figure 2:
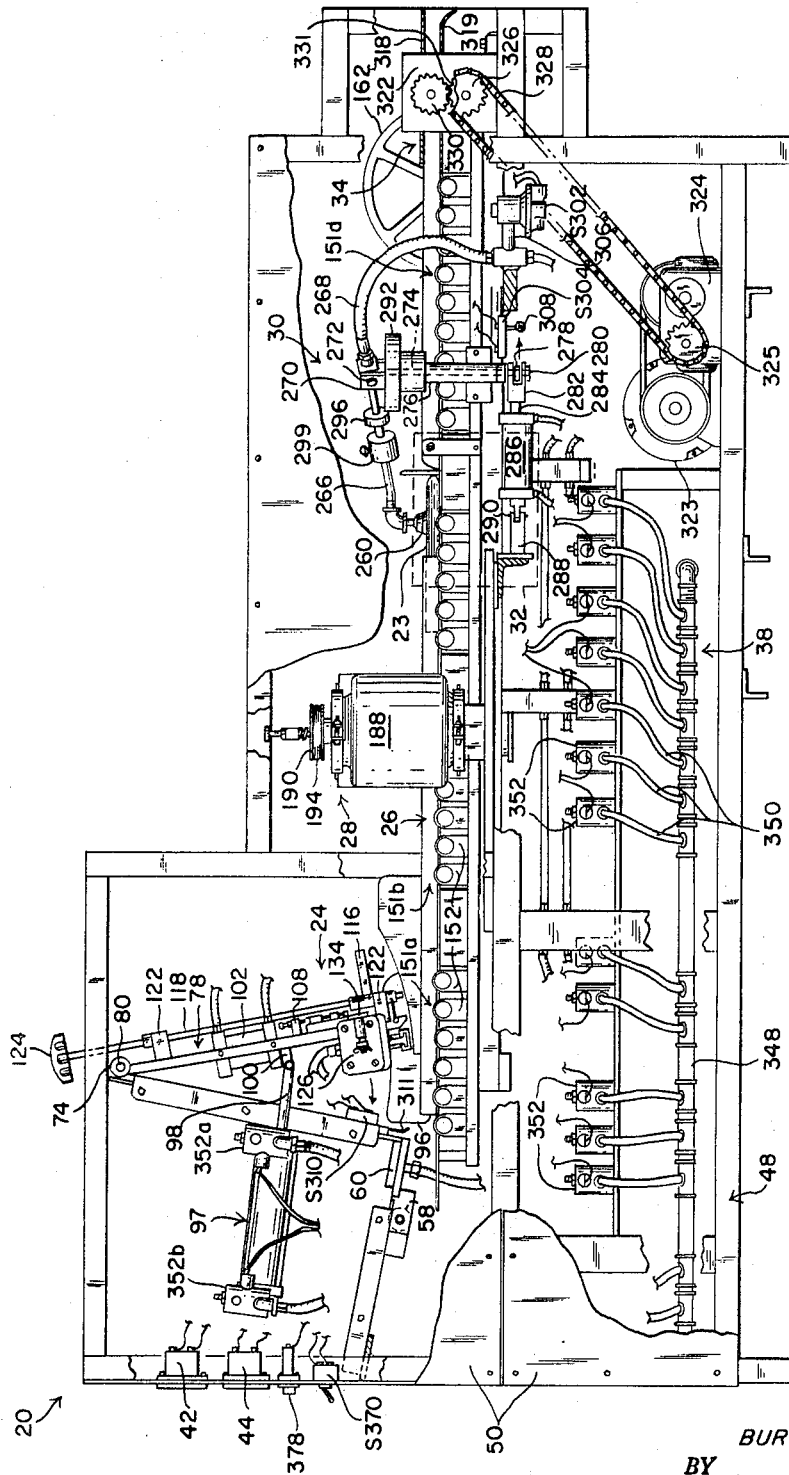
FIGURE 2 is a side view of the magazine processing machine of FIGURE 1 with a number of panels broken away to show the internal construction of the machine.

Referring now especially to FIGURE 2, support assembly 78 is pivoted through its clockwise and counterclockwise strokes about pivot member 80 by a vacuum motor 97 mounted on side wall 52 of hopper 22. The connecting rod 98 of the motor is pivotally attached to a link 100 fixed to one of the two guides 72 of assembly 78 (see also FIGURE 5). Accordingly, as the right-hand and left-hand ends of the motor are connected to a vacuum source provided by vacuum system 38, connecting rod 98 moves to the left and to the right as shown in FIGURE 2, moving the support assembly through the clockwise and counterclockwise strokes discussed above.

The upward and downward movement of slide 82 employed to first position pick member 94 above floor 56 of hopper 22 so that it will properly penetrate into the magazine thereon and then move the magazine downwardly through opening 59 is effected by a second vacuum motor 102 mounted between the guides 72 of support assembly 78. The connecting rod 103 of this motor is connected through an articulated link 104 (see FIGURE 6) to a fixed link 106 which, in turn, is attached to slide 82.

As the lower and upper ends of vacuum motor 102 are respectively connected to the vacuum source, connecting rod 103 moves upwardly and downwardly relative to guides 72, effecting a concomitant upward and downward movement of slide 82 and pick member 94.

The upward and downward movement of pick member 94 is limited by adjustable stops 108 and 110, which are threaded through stop supports 112, the latter in turn being fixed to one of the two guides 72 of support assembly 78. Stops 108 and 110 engage a co-operating member 114 fixed to slide 82 to limit the vertical movement of the the latter and, accordingly, the vertical movement of the pick member.

As best shown in FIGURE 7, pick mechanism 24 is also provided with a displaceable stop 116 fixed to an elongated control rod 118 by a bracket 120. Control rod 118 is journalled in brackets 122 and extends through the top of machine 20 (see FIGURES 1 and 2) where a control knob 124 is fixed to its upper end.

Stop 116 can be rotated by control knob 124 between one position in which it is interposed between slide supported stop member 114 and the upper adjustable stop 108 and an inoperative position in which stop member 114 can move upwardly until it contacts the adjustable stop 108 so that stop member 108 controls the upward movement of pick member 94 except when stop 116 is rotated to its operative position.

The stop members 108 and 116 described above control the distance pick member 94 will be above the floor 56 of hopper 22 when it is extended through opening 95 into the magazine 23 on the bottom of the hopper. The control is normally effected by stop 108 which will typically be adjusted so that the pick member will enter the magazine on the order of nine pages above the hopper floor.

For very thin magazines, such as brochures, television guides, etc. this distance may be too great due to the thinness of the item involved. However, stop member 116 permits such items to be routinely processed without readjusting stop member 108 and even without interrupting the smooth flow of magazines through the machine. When thin magazines are being processed (or when a thin magazine reaches the bottom of the pile in hopper 22), control knob 124 is simply rotated to move stop member 116 between the stop member 114 attached to slide 82 and upper adjustable stop 108. This reduces the upward travel of the slide and therefore that of the pick member, reducing the separation between it and the hopper floor when the pick member is extended into the hopper. To thereafter resume the processing of relatively thick magazines, control knob 124 is rotated to move stop 116 to an inoperative position.

Referring now specifically to FIGURE 5, the extension and retraction of pick member 94 is effected by a third vacuum motor 126 pivotally connected at one end to a stud 128 by a bracket 130 and a retainer such as cotter key 132. Stud 128 is in turn attached to one end of an elongated arm 134 mounted on the vertically movable slide 82 (see also FIGURE 7).

The connecting rod 136 of motor 126 is fixed by pivot pin 138 to a crank 140 attached to slide 82 by pivot member 142. The opposite end of the crank is fixed by pivot pin 144 to one end of a link 146 pivotally attached at its opposite end by pivot member 148 to pick member support 90. As the right-hand and left-hand ends of the motor are respectively connected to the vacuum source, connecting rod 136 of the motor moves to the left and to the right as shown in FIGURE 6, causing counterclockwise and clockwise movement, respectively, of crank 140. Counterclockwise and clockwise movement of crank 140 causes link 146 and support 90 to move to the right and to the left, retracting and extending the pick member.

Figure 3:
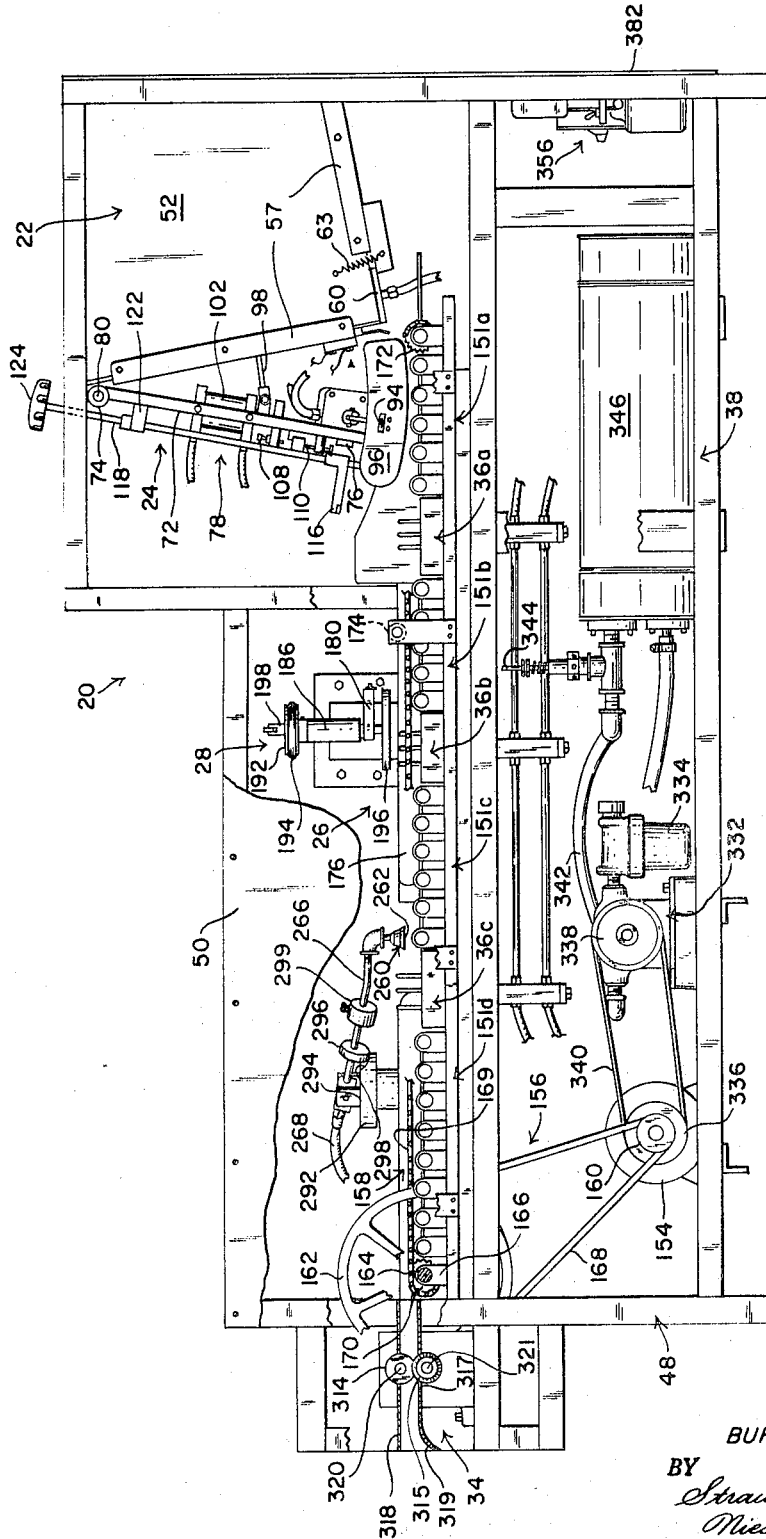
FIGURE 3 is a view similar to FIGURE 2, but looking at the machine from the opposite side.

Referring now primarily to FIGURES 2, 3, and 11, the conveyor 26 onto which the magazines 23 are dropped by pick mechanism 24 includes a plurality of rollers 150, which are rotatably supported from the framework 48 of machine 20 in four groups 151a–d by bearing assemblies 152, and plates 153 supported from machine framework 48 which bridge the gaps between adjacent groups of rollers. Rollers 150 are driven by a motor 154, which is drive-connected to the rollers by a belt drive 156 and a chain drive 158. The belt drive includes a pulley 160 fastened to the motor output shaft, a pulley 162 fixed to a shaft 164 which is rotatably supported from the machine framework by bearing assemblies 166, and a belt 168 trained around the pulleys.

Chain drive 158 includes an endless chain 169 trained around a sprocket 170 fixed to shaft 164 and a sprocket 172 fixed to the roller 150 at the opposite, feed end of the machine. Endless chain 169 also engages sprockets 173 fixed to the remaining rollers 150 (see FIGURE 10) so that all of the rollers are driven. Conventional idlers 174 (one of which is shown in FIGURE 3) keep the upper run of the chain taut and in engagement with the sprockets it engages.

As shown in FIGURE 11, rollers 150 are oriented in skew relationship to the longitudinal centerline of the machine, i.e., with their axes of rotation at a small angle to a line normal to the longitudinal axis and with the trailing edges of the rollers at the right-hand side of the machine. This is an important feature of the invention as the skew arrangement of the rollers will cause any magazine 23 dropped on them by pick mechanism 24 to drift to the right as they are transported toward the discharge end of the machine until they engage a guide rail 176 extending from the feed end of the conveyor past coupon cutting mechanism 28. In this manner, the magazines are automatically positioned laterally on the conveyor as they move along it from feed hopper 22 to coupon cutting mechanism 28 and to succeeding stations.

Referring now specifically to FIGURE 12, the coupon cutting mechanism 28 to which the magazines are first delivered includes a depending knife member 178 removably attached to a knife support 180 which is fixed to a hollow drive shaft 184. The guide shaft is rotatably supported by suitable bearings (not shown) in a cylindrical bracket 186 attached to machine framework 48.

Knife support 180 is rotated by a motor 188 mounted on machine framework 48 and drive-connected to shaft 184 by pulleys 190 and 192 and belt 194. This moves knife member 178 in a circular path so that it cuts a generally semicircular coupon from the covers of the magazines processed through machine 20.

Co-operating with knife member 178 in the severing of the coupons is a vertically adjustable flat disc or platen 196 which serves two functions. First, the cover of the magazine 23 being processed is pressed against it while the coupon is cut; and the platen accordingly prevents the coupon from being pulled off the magazine at it is cut. Second, by adjusting disc 196 up and down, the depth of cut of the knife member can be varied to accommodate magazines having covers of varying thicknesses, different length knives, etc.

As best shown in FIGURE 12, disc 196 is fixed to the bottom end of a shaft 198 which extends vertically through the hollow drive shaft 184. The upper end of shaft 198 is fixed by pin 200 to an elongated rigid link 202 which is pivotally mounted on machine framework 48 by a vertically extending standard 204 and pivot pin 206.

An adjustable stop 208 is threaded through the end of link 202 opposite shaft 198. Stop 208 engages a fixed member 210 extending upwardly from machine framework 48; and both stop 208 and co-operating member 210 are encircled by a compression spring 212 extending between link 202 and the machine framework. Spring 212 biases link 202 in a counterclockwise direction about pivot pin 206 (as shown in FIGURE 12), thereby biasing platen 196 downwardly against the magazine 23 being processed.

The magazine exerts an oppositely directed force on the platen as the magazine is raised into the cutting position, biasing link 202 in a clockwise direction about pin 206 against the force exerted by the spring. Stop 208 limits this upward movement and, accordingly, the distance which knife member 178 can penetrate into the magazine as the coupon is severed. This depth of cut can be varied by threading stop 208 upwardly and downwardly in link 202.

Referring now to FIGURES 11 and 12, the magazines 23 being processed are stopped in the proper position along conveyor mechanism 26 relative to cutter mechanism 28 by stop assembly 36b and then raised into cutting relationship with knife member 178 by a novel magazine elevating mechanism 214.

As shown in FIGURE 9, stop assembly 36b includes a set of three stop pins 216 extending vertically through apertures 218 in a plate 220 which is supported by a bracket 222 from machine framework 48 between the second and third groups of rollers 151b and 151c in conveyor 26. As shown in FIGURES 9 and 11, stop pins 216 are disposed in a straight line inclined at an angle to a line normal to the longitudinal centerline of conveyor 26 in the opposite direction from the centerlines of rollers 150. This is done to properly position the magazines 23 being processed in relation to coupon cutting mechanism 28.

The lower ends of stop pins 216 are fixed to a transversely extending support 224 mounted for vertical movement in parallel, spaced apart, vertical guides 226 provided with grooves 228 into which the ends of support 224 extend. The lower ends of guides 226 are connected by a transversely extending cross member 230 into a unitary structure for rigidity.

Stop pins 216 of assembly 36b are elevated to halt magazines 23 on conveyor 26 and retracted to permit the magazine to continue on through the machine by a vacuum motor 232 mounted on cross member 230 with its connecting rod 234 attached to the vertically movable pin support 224. Accordingly, when the lower end of the vacuum motor is connected to the vacuum source, the connecting rod moves upwardly together with support 224 and pins 216 until the latter reach the operative position shown in dotted lines in FIGURE 9. Conversely, when the upper end of the motor is connected to the vacuum source, connecting rod 234 and support 224 are retracted, lowering the pins to the inoperative position shown in full lines in FIGURE 9.

Referring now to FIGURES 11–13, the mechanism 214 for elevating the magazines 23 being processed into coupon severing relationship with knife member 178 includes a generally circular support 236 supported beneath magazine cover engaging platen 196 by the connecting rod 238 of a vacuum motor 240 mounted on a cross member 242 of machine framework 48. Accordingly, as the lower and upper ends of motor 240 are respectively connected to the vacuum source, support 236 is moved upwardly to elevate a magazine 23 thereon until the magazine is stopped by the cover engaged mechanism described above and downwardly to the inoperative position shown in FIGURE 12.

The magazine elevating mechanism just described is one of the important features of the present invention since it automatically accommodates magazines of different thicknesses. Specifically, motor 240 will move support 236 and the magazine 23 thereon upwardly until the magazine engages platen 196 and will then move the support, magazine, and platen upwardly until stop 208 engages vertically extending abutment member 210. At this point, at which the magazine is in the proper cutting relationship to knife member 178 determined by the adjustment of stop 208, the vacuum motor will simply stall, maintaining the magazine in this operative position until the upper end of the motor is connected to the vacuum source. Accordingly, irrespective of the thickness of the magazine being processed, the upper cover of magazine from which the coupon is severed will always be automatically raised to the same elevation and will accordingly always be located in the same vertical location relative to knife member 178 since the vacuum motor will be stalled in a higher or lower position depending upon the thickness of each magazine.

As shown in FIGURES 12 and 13, the plate 220 bridging the two groups of rollers 151b and 151c in conveyor 26 is cut away to accommodate support 236; and the right-hand end portions 244 of the last two rollers 150b–1 and 150b–2 in the second group are reduced in diameter for the same purpose. However, to insure proper transfer of the magazines 23 being processed along conveyor 26 onto the support 236 of magazine elevating mechanism 214, two rollers 246, which may be integral with or affixed to reduced diameter end portion 244 of roller 150b–1 and a similar roller 248, fixed to the reduced diameter end portion of shaft 150b–2, are provided. A resilient ring 250 around roller 248 provides additional friction between this roller and the magazine being processed to assist in moving the magazine into the proper position on the support.

Referring now to FIGURES 2, 3, and 11, the magazines 23 being processed with coupons severed from them by the mechanism just described move from cutter mechanism 28 to the vacuum pickup or transfer mechanism 30 where the loose coupons are picked up and transferred to collection receptacle 32, which may be of any desired construction. As the magazines move from cutter mechanism 28 toward transfer mechanism 30 they are displaced toward the center of conveyor 26 by an inwardly curved end portion 254 of longitudinally extending guide rail 176 to position them laterally in proper relationship to the transfer mechanism.

When the magazines reach the transfer mechanism 30, they are stopped by pins 216 of stop assembly 36c. This assembly is substantially identical to stop assembly 36b and is located so that its pins extend upwardly through a plate member 256 bridging the third and fourth groups of rollers 151c and 151d of conveyor mechanism 26. These pins stop the magazine in the dotted line position identified by reference character 23c in FIGURE 11 with the severed coupon 258 directly below the pickup head 260 of the transfer mechanism.

Stop mechanisms 36b and 36c are operated simultaneously so that the coupon is severed from one magazine while the coupon from the preceding magazine is being picked up. At the same time the third stop assembly 36a is also actuated to halt yet a third magazine on conveyor 26 ahead of coupon cutter mechanism 28. Accordingly, when the stop pins of the three assemblies are retracted, a magazine is available for immediate delivery to the coupon cutter mechanism, materially increasing the processing rate over that which could otherwise be attained.

Referring again to FIGURES 2, 3, and 11, pickup head 260 is a hollow bell-shaped member with a flat, apertured lower face 262 which is adapted to engage the severed coupons. The interior of the pickup head can be connected through a rigid conduit 266 and a flexible conduit 268 to the vacuum source in vacuum system 38.

Rigid conduit 266 also provides a support for the vacuum head and is pivotally connected at the end opposite the head to a bifurcated bracket 270 by pivot pin 272. Bracket 270 is fixed to the upper end of a shaft 274 extending downwardly through a hollow, cylindrical support 276.

As best shown in FIGURE 2, a crank 278 is fixed to the bottom end of shaft 274. This crank is in turn, fixed by pivot pin 280 to a bifurcated bracket 282. This bracket is mounted on the end of the connecting rod 284 of a vacuum motor 286 supported from machine framework 48 by bracket 288 and pivot pin 290. Accordingly, as the right-hand and left-hand ends of the vacuum motor (as shown in FIGURE 2) are respectively connected to the vacuum source, crank 278 and shaft 274 are pivoted in a clockwise and in a counterclockwise direction in support 276. This effects a correspondingly directed movement of rigid conduit 266 and pickup head 260 shifting the latter between the positions in which it picks up the severed coupons and drops them into collection receptacle 32.

When a magazine 23 is stopped at the transfer mechanism by stop assembly 36c, the pickup head is in the position shown in dotted lines in FIGURE 11 in which it is above collection receptacle 32. The right-hand end of the vacuum motor is then connected to the vacuum source, shifting the pickup head 260 counterclockwise until it is above coupon 258. At the same time the vacuum head is connected to the vacuum source through conduits 266 and 268. Accordingly, when the vacuum head engages coupon 258, the coupon will adhere to it. Following this, the right-hand end of the vacuum motor is connected to the vacuum source, causing the pickup head with the coupon attached to swing in a counterclockwise direction to a position above collection receptacle 32. Thereafter, the connection between the pickup head and the vacuum source is interrupted and the coupon permitted to fall by gravity into the collection receptacle.

As shown in the figures mentioned above, a cylindrical cam 292 having a cam surface 294 is fixed to the upper end of the support 276 through which shaft 274 extends. A cam follower 296, rotatably fixed to vacuum pickup support 266, follows cam surface 294 as the pickup head 260 is shifted between the positions shown in full and dotted lines in FIGURE 11 by the mechanism described in the preceding paragraphs. As best shown in FIGURE 3, cam follower 296 rides into a depressed portion 298 of the cam as it approaches the full line position where it engages and picks up the severed coupon 258 so that it thereby is lowered into engagement with the coupon as it approaches this position. A weight 299 fixed to support 266 insures that the follower rides into depression 298 and that the pickup head is accordingly lowered into firm engagement with the severed coupon as the follower moves along the cam track.

As head 260 picks up the severed coupon and is shifted to the dotted line position where the coupon is deposited in receptacle 32, follower 296 moves on to the high portion of the cam surface. This elevates pickup head 260 so that it clears the components of machine 20 lying in its path between the coupon pickup point and the point at which the coupon is released from the pickup head.

Referring now to FIGURES 1, 2, and 16, resettable coupon counter 44 and nonresettable coupon counter 46 are advanced as the coupons are deposited in the collection receptacle. As shown in the last-mentioned figures, counters 44 and 46 are wired in parallel with each other and in series with a source of operating voltage 300 through serially connected switches S302 and S304. This arrangement is also an important feature of the instant invention since it prevents actuation of the counters unless a coupon is actually transferred to the collection receptacle.

Specifically, switch S302 is a conventional vacuum switch located in a conduit 306 between the vacuum source and pickup head 260 and is closed only if a coupon is actually picked up by head 260 to thereby produce a vacuum in the conduit. If the coupon is not picked up, the vacuum will not be produced to close the switch.

Switch S304 is located with its actuator 308 positioned for engagement by crank 278 when the latter is so positioned that pickup head 260 is above collection receptacle 32. Accordingly, this switch will not close unless the pickup is properly shifted to the collection receptacle.

Since they are wired in series between the counters and the power source, both switches S302 and S304 must be closed to connect counters 44 and 46 across power source 300 to advance them. Accordingly, the counters will not be advanced unless a coupon is actually picked up by transfer head 260 and transferred by the head to the collection receptacle. Therefore, the novel arrangement just described insures that only those coupons which are actually deposited in the collection receptacle are counted.

To provide a check on counters 44 and 46, the third counter 42 mentioned above is employed. Referring now to FIGURE 5, counter 42 is connected to the source of operating voltage through a switch S310 located with its actuator 311 opposite the opening 59 through which magazines are removed from hopper 22. Accordingly, as each magazine 23 is removed from the hopper, it trips actuator 311 to close switch S310 and connect counter 42 across voltage source 300, thereby advancing this counter.

Referring now to FIGURES 2, 3, and 11, the magazines 23 from which the severed coupons have been removed are transferred by section 151d of conveyor mechanism 26 from coupon pickup mechanism 30 to the cutter mechanism 34 which destroys the magazines, making them unreadable. As the magazines move from transfer mechanism 30 to cutter mechanism 34, they engage a wedge-shaped guide 312 which turns them from the generally crosswise orientation they can have to a position in which they are oriented lengthwise of the machine before they pass through the cutter mechanism. This is so the magazines will be cut along a line parallel to the binding of the magazine. This destroys coupons and other items bound into the magazine destroyed by cutter mechanism 34 to make them unredeemable. A longitudinal extension 313 of guide 312 is engaged by the magazines as they move through the cutters to maintain the desired separation between the line of cut and the bindings of the magazines.

The cutter mechanism 34 through which the reoriented magazines pass includes upper and lower rotating knives 314 and 315 extending through slots 316 and 317 in horizontal, spaced apart upper and lower guides 318 and 319 between which the magazines pass. The knives are mounted so that they overlap slightly in a vertical direction and have their cutting edges in the same vertical plane. Accordingly, as the magazines 23 pass through, they are cut in two along the desired line parallel to the magazine. From this point the severed parts of the magazines drop from lower guide 319 into a receptacle or onto an appropriate conveyor (not shown) for delivery to a baler or other packaging apparatus (not shown).

Referring again to FIGURES 2, 3, and 11, knives 314 and 315 are fixed to transversely extending shafts 320 and 321 rotatably journalled in bearings 322 on machine framework 48. Lower shaft 319 and the knife 315 fixed thereto are rotated by a motor 323 through a drive train including a speed reducer 324 having an output gear 325, a gear 326 fixed to the end of lower knife shaft 321 and an endless chain 328 trained around gears 325 and 326. Shaft 320 and upper cutter 314 are driven from lower shaft 321 by a gear 330 on the upper shaft and a meshing gear 331 fixed to the lower shaft.

As mentioned briefly above and as will be apparent from the foregoing, the various mechanisms of machine 20 except for those driven by electric motors 154, 188, and 323 are operated by the various vacuum motors described above, which are incorporated in vacuum system 38. In addition to these motors, system 38 includes a vacuum pump 332 provided with a conventional muffler 334 and is driven by conveyor motor 154 through a drive train including pulleys 336 and 338 and belt 340. The vacuum pump is connected through flexible conduit 342 and pressure regulator 344 to a vacuum tank or accumulator 346.

Vacuum tank 346 is connectable to the various vacuum motors described previously through main vacuum line 348 and a system of branch vacuum lines identified generally by reference character 350 in which solenoid operated valves 352 are interposed. Accordingly, by actuating valves 352, the vacuum motors can be connected through the conduit system described above to the vacuum source or tank 346.

Figure 14:
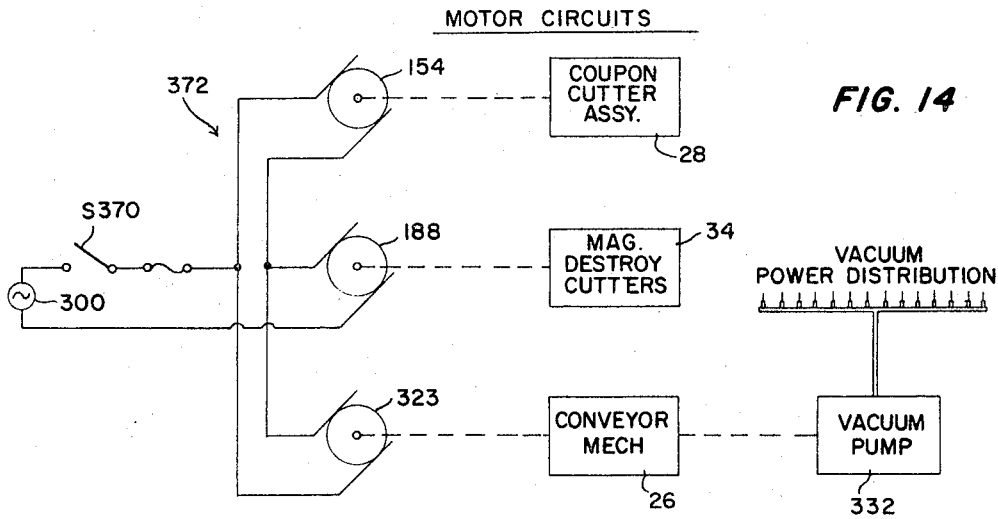
FIGURE 14 is a schematic diagram of the circuits for three motors incorporated in the machine of FIGURE 1.
Figure 15:
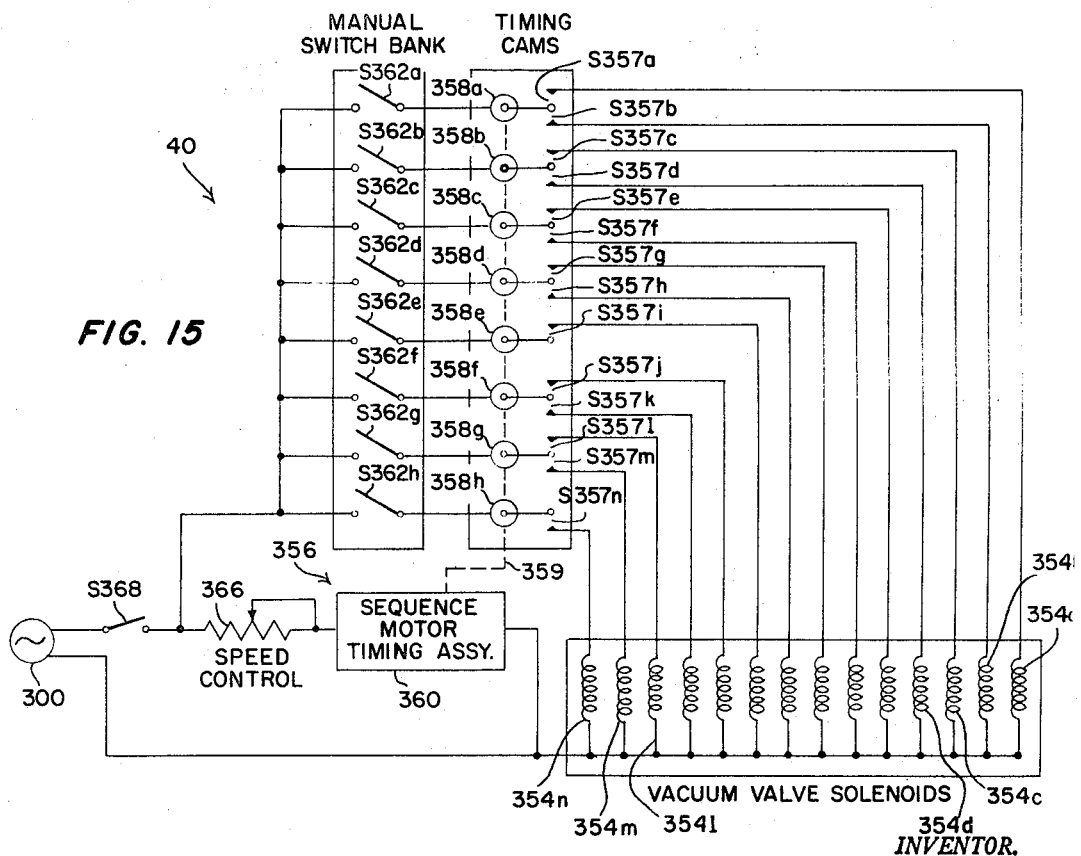
FIGURE 15 is a schematic of the control system for the machine.

Referring now to FIGURE 14, vacuum valves 352 are actuated to connect the vacuum motors to vacuum tank 346 by energizing solenoids 354 incorporated in the valves. Energization of the solenoids is effected by timing mechanism 356 of conventional construction. This timer includes switches S357 adapted to be opened and closed by cams 358a–h mounted on a timing shaft 359 rotatable by timer motor 360. The solenoids 354 of valves 352 are connected to the source of operating voltage 300 through the associated switches S357, and also through manual switches S362 which are normally closed. Accordingly, as switches S357 are opened and closed by cams 358, the associated solenoids 354 are energized and deenergized to open and close the corresponding valves.

The manual switches S362 in series with cam-operated switches S357 are provided so that the operation of individual operating mechanisms may be checked without the necessity of operating the entire machine.

In addition to the components described above the control system 40 for the machine includes a conventional speed control 366 such as a Variac connected between timer motor 360 and power source 300. This control is provided for coordinating the operation of the mechanisms regulated by timing mechanism 356 to the operation of conveyor 26 to provide the proper speed relation therebetween.

The operation of machine 20 is initiated by closing a normally open switch S368 in the control system 40 to connect timing mechanism 356 across voltage source 300 and by closing a normally open switch S370 in a circuit identified generally by reference character 372 to connect motors 154, 188, and 323 across the power source.

The operation of the various components of machine 20 have been described individually in detail above. However, it will be apparent that all of these mechanisms operate concomitantly during actual operation of machine 20 with timer mechanism 356 cycling each mechanism through its operating sequence (except for conveyor 26, cutter member 178, and cutters 314 and 315, which operate continuously) and correlate the operating cycles of the different mechanisms. The following table describes a typical operating cycle of the machine although this can be varied as desired by adjusting the timer cams.

*Sequence of steps in exemplary operating cycle*

(1) Pick member support assembly 78 pivoted clockwise and pick member 94 raised to move pick member to position opposite bottom magazine in hopper 22.

Vacuum applied to apertured door member 64 to maintain bottom magazine 23 in position.

(2) Clockwise pivotal movement of support assembly and raising of pick member continued. Vacuum to door member continued. Stop pins 216 in stop assemblies 36a–c raised to intercept and stop magazines on conveyor 26.

(3) Pivotal movement of support assembly and raising of pick member continued. Vacuum to door member 64 continued. Stop pins maintained in raised positions. Vacuum applied to head 260 of coupon transfer mechanism 30.

(4) Pivotal movement of support assembly and raising of pick member continued. Vacuum to door member 64 continued. Stop pins maintained in raised positions. Vacuum to head 260 maintained. Vacuum head 260 moved clockwise to pick up severed coupon 258.

(5) Pivotal movement of support assembly and raising of pick member continued. Pick member 94 extended to insert it into bottom magazine. Vacuum to door member 64 continued. Stop pins maintained in raised positions. Vacuum to head 260 maintained. Movement of head 260 continued.

(6) Pivotal movement of support assembly concluded. Extension of pick member into magazine continued and downward movement of pick member started to open door 60 for removal of magazine. Vacuum to door member 64 continued. Stop pins 216 retained in raised positions. Vacuum to head 260 maintained. Movement of head 260 toward pickup position continued.

(7) Pick member support assembly pivoted counterclockwise and downward movement and extension of pick member continued to remove magazine from hopper through opening 59 in hopper floor 56. Vacuum to door member continued. Stop pins 216 maintained in raised positions. Vacuum to head 260 maintained. Movement of head 260 continued.

(8) Counterclockwise movement of pick member support assembly and downward movement and extension of pick member continued. Vacuum to door member continued. Stop pins 216 maintained in raised positions. Vacuum to and movement of head 260 continued to drop head into engagement with severed coupon to attach coupon to head. Vacuum motor 240 energized to elevate magazine halted by stop pins 216 of stop assembly 36b against platen 196 and knife member 178 for severing of coupon.

(9) Counterclockwise movement of support assembly and downward movement and extension of pick member continued. Vacuum to door member continued. Stop pins 216 maintained in raised positions. Coupon pickup head elevated and swung counterclockwise with attached coupon toward coupon collection receptacle 32. Vacuum to head 260 continued. Energization of vacuum motor 240 continued to maintain platen and magazine in elevated, cutting position.

(10) Counterclockwise movement of pick member support assembly and downward movement and extension of pick member continued. Vacuum to door member continued. Stop pins 216 maintained in raised positions. Movement of pickup head 260 and coupon toward receptacle 32 continued. Vacuum on head 260 maintained. Vacuum motor 240 energized to retract platen and lower magazine with severed coupon in place.

(11) Counterclockwise movement of pick member support assembly and downward movement and extension of pick member continued. Vacuum to door member 64 continued. Stop pins 216 of stop assemblies 36a–c retracted to permit magazines to move forwardly to next station. Retraction of platen at coupon cutter continued. Movement of head 260 to receptacle 32 completed and vacuum on head released to allow coupon to drop into receptacle. Coupon counters 44 and 46 advanced.

(12) Movement of pick member support assembly and downward movement and extension of pick member continued. Retraction of platen and movement of head 260 continued. Vacuum on door member 64 released.

(13) Forward movement of support assembly and downward movement of pick member continued. Pick member retracted to allow magazine to drop onto conveyor 26. Counter 42 advanced. Retraction of platen 196 and counterclockwise movement of coupon pickup head 260 completed. Cycle complete.

In the particular timing mechanism illustrated in FIGURES 4 and 14, cam 358a operates switches S357a and S357b and, accordingly, the solenoids 354a and 354b. These solenoids are incorporated in valves 352a and 352b so that cam 358a controls the connection of the right-hand and left-hand ends of vacuum motor 97 to vacuum source 346 and, accordingly, the clockwise and counterclockwise pivotal movement of pick member support assembly 78.

Cam 358b controls the opening and closing of switches S357c and S357d and, thereby, the energization and de-energization of the solenoids 354c and 354d incorporated in solenoid valves 352c and 352d. The latter are interposed in the branch vacuum lines 350 to vacuum motor 102 so that cam 358b controls the raising and lowering of pick member 94.

Cam 358c similarly controls the lateral movement of pick member 94 to insert it into and retract it from magazines 23 as they are removed from hopper 22. Cam 358d controls the operation of the vacuum motors in stop assemblies 36a–c and accordingly, the simultaneous elevation of the stop pins in these assemblies to their operative positions and retraction of the stop pins to their inoperative positions.

Cam 358e controls the vacuum to the vacuum member 64 in hopper 22, and cam 358f controls the vacuum motor 240 in the assembly 214 by which magazines 23 being processed are raised into operative relationship with coupon cutting knife member 178. Cam 358g controls the operation of vacuum motor 286 and, therefore, the swinging movement of coupon pickup head 260 between the positions shown in full and dotted lines in FIGURE 11. The eighth cam, 358h, controls the connection of pickup head 260 to the vacuum tank.

The details of the timing mechanism may of course be varied as desired to effect the sequence of operations. Accordingly, the foregoing description of an exemplary setup for the timing mechanism is merely intended to illustrate and not restrict the scope of the present invention.

The switch S370 for energizing motors 154, 188, and 323 and the switch S368 for energizing control circuitry 40 are mounted on an upper front panel 374 of the machine together with a lamp 376 for indicating that the machine is on and fuses 378. Referring now to FIGURE 4, the remainder of the electrical components including timing mechanism 356, timer motor speed control 366, and a main power switch S380 are mounted on a hinged panel 382 at the front or feed end of the machine below panel 374. This panel may be pivoted downwardly to afford ready access to these components.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Magazine counting and destroying apparatus or the like, comprising: feed means for the magazines to be counted and destroyed; means for severing coupons from the covers of said magazines; means for separating the severed coupons from the magazines; means for registering the number of coupons separated from the magazines; means for so mutilating the magazines from which the coupons have been severed as to make said magazines essentially unreadable; and means for automatically removing magazines from said feed means and transferring said magazines seriatim to said coupon severing means, the means for separating the severed coupons from the magazines, and the means for mutilating the magazines.

2. The apparatus of claim 1, wherein the coupon severing means comprises a cutter mounted in a fixed longitudinal position and means for pressing the cover of the magazine from which the coupon is to be cut against said cutter with a predetermined force to thereby automatically produce a coupon severing relationship between said cutter and the magazine cover, irrespective of the thickness of the magazine.

3. The apparatus of claim 1, wherein the means for separating the severed coupons from the magazines from which they are cut includes pick-up means, means for moving said pick-up means into engagement with a severed coupon, means for applying a vacuum to said pick-up means while it is engaged with said coupon to cause said coupon to adhere to the pick-up means, collection means for the severed coupons, means for displacing said pick-up means and the coupon adhered thereto to said collection means, and means for thereafter releasing the vacuum on said pick-up means, whereby the coupon adhered thereto will be released from the pick-up means and transferred to the coupon collection means by gravity.

4. The apparatus of claim 3, wherein said coupon displacing means further comprises an elongated pick-up arm having said pick-up means fixed thereto, a support mounted for rotation about a generally vertical axis, means fixing said pick-up arm to said support for pivotal movement about a generally horizontally axis, means for pivoting said support about said vertical axis to swing said pick-up means between the magazines on said magazine transferring means and said coupon collection means, and means including a stationary cam and a cam follower fixed to said pick-up arm for lowering the pick-up means into engagement with the magazines on said magazine transferring means and for elevating said pick-up means as it swings toward said collection means.

5. The apparatus of claim 3, wherein the means for registering the number of severed coupons is electrically actuated and wherein the apparatus further includes circuit means having first and second normally open switch means therein for connecting said registering means to a source of operating power to advance the count shown by said registering means, means operable coincidentally with the adherence of a severed coupon to said pick-up means to close the first of said switches, and means operable coincident with the arrival of said pick-up means at the collection means to close the second of said switches and complete the continuity of said circuit means, whereby said registering means will be advanced only if the severed coupon is properly pickup up and transferred to said collection means.

6. The apparatus of claim 1, wherein the means for automatically transferring the magazines removed from the feed means to the coupon severing and separating and magazine mutilating means comprises conveyor means, means for effecting continuous operation of said conveyor means during operation of the apparatus, first and second stop means associated with said coupon severing and coupon separating means, respectively, for positioning magazines approaching said severing means and said separating means in operative positions relative thereto; and means for automatically actuating the first stop means as such magazine approaches the coupon severing means and the second stop means as the magazine approaches the coupon separating means.

7. The apparatus of claim 1, wherein said magazine transferring means includes conveyor means comprising a series of transversely oriented, generally horizontal rollers disposed in parallel spaced apart relationship and extending generally from said magazine feed means to said magazine mutilating means and means for rotating said rollers, said rollers being oriented with their axes of rotation at an angle relative to a line normal to the longitudinal axis of the conveyor means, whereby said rollers will move magazines deposited thereon to and maintain them at the side of the conveyor means at which the trailing edges of said rollers are located to thereby facilitate the positioning of said magazines laterally of said conveyor means.

8. The apparatus of claim 1, wherein the magazine transferring means comprises means for orienting the magazines lengthwise and in a predetermined position laterally of the conveyor as they approach the magazine mutilating means, whereby each said magazine will be severed lengthwise as it passes through said last-named means to thereby destroy coupons and other items bound into the magazines.

9. The apparatus of claim 1, wherein said feed means is adapted to receive a pile of the magazines to be counted and destroyed therein and wherein the means for removing the magazines from said feed means includes a pick member oriented laterally relative to said feed means and means for sequentially moving said pick member to a position adjacent said feed means and opposite the bottom magazine therein, laterally into said feed means and between adjacent pages of the bottom magazine therein, longitudinally of said feed means to first engage said pick member with the binding of the magazine and then move said magazine longitudinally of the feed means to the magazine transferring means, and laterally relative to said magazine transferring means to withdraw said pick member from the magazine.

10. The apparatus of claim 9, wherein the means for removing the magazines from the feed means further comprises an elongated support mounted at the upper end thereof for pivotal movement about an axis extending laterally of said feed means; a laterally extending guide for said pick member mounted for upward and downward movement relative to and along said support; a first motor means for pivoting said support about said axis to first position said pick member opposite said feed means and then move the pick member and the magazine engaged thereby from said feed means toward said magazine transferring means; a second motor means for raising and lowering said guide relative to said support to first position said pick member vertically for insertion into the bottom magazine in said feed means and to then move the magazine engaged by said pick member downwardly through an opening in the bottom of the feed means; and a third motor means for moving said pick member forwards and backwards relative to said guide to thereby effect the lateral movement of said pick member necessary for insertion of the pick member into and withdrawal of said member from said magazines.

11. The apparatus of claim 1, wherein the magazine mutilating means comprises cooperating upper and lower knives rotatable about axes extending laterally of said magazine transferring means.

12. Magazine counting and destroying apparatus or the like, comprising: feed means for the magazines to be counted and destroyed; means for severing coupons from the covers of said magazines; means for separating the severed coupons from the magazines; means for registering the number of coupons separated from the magazines; means for so mutilating the magazines from which the coupons have been severed as to make said magazines essentially unreadable; and means for automatically removing magazines from said feed means and transferring said magazines seriatim to said coupon severing means, the means for separating the severed coupons from the magazines, and the means for mutilating the magazines, the means for automatically transferring the magazines removed from the feed means to the coupon severing and separating and magazine mutilating means comprising conveyor means, means for effecting continuous operation of said conveyor means during operation of the apparatus, first and second stop means associated with said coupon severing and coupon separating means, respectively, for positioning magazines approaching said severing means and said separating means in operative positions relative thereto, and means for automatically actuating the first stop means as each magazine approaches the coupon severing means and the second stop means as the magazine approaches the coupon separating means, said actuating means comprising means for simultaneously actuating said first and second stop means to thereby simultaneously position one magazine in operative relationship to the coupon severing means and the preceding magazine in operative relationship to the coupon separating means.

13. Magazine counting and destroying apparatus or the like, comprising: feed means for the magazines to be counted and destroyed; means for severing coupons from the covers of said magazines comprising a cutter support mounted for rotation about a vertical axis, a depending cutter fixed to said support at a location spaced from the axis about which the cutter support rotates, means for rotating said cutter support, and means for pressing the cover of the magazine from which the coupon is to be cut against said cutter with a predetermined force to thereby automatically produce a coupon severing relationship between said cutter and the magazine cover irrespective of the thickness of the magazine; means for separating the severed coupons from the magazines; means for registering the number of coupons separated from the magazines; means for so mutilating the magazines from which the coupons have been severed as to make said magazines essentially unreadable; and means for automatically removing magazines from said feed means and transferring said magazines seriatim to said coupon severing means, the means for separating the severed coupons from the magazines, and the means for mutilating the magazines.

14. Magazine counting and destroying apparatus or the like, comprising: feed means for the magazines to be counted and destroyed, said feed means being adapted to receive therein a pile of the magazines to be counted and destroyed; means for severing coupons from the covers of said magazines; means for separating the severed coupons from the magazines; means for registering the number of coupons separated from the magazines; means for so mutilating the magazines from which the coupons have been severed as to make said magazines essentially unreadable; and means for automatically removing magazines from said feed means and transferring said magazines seriatim to said coupon severing means, the means for separating the severed coupons from the magazines, and the means for mutilating the magazines, the means for removing the magazines from said feed means including a pick member oriented laterally relative to said feed means, means for sequentially moving said pick member to a position adjacent said feed means and opposite the bottom magazine therein, laterally into said feed means and between adjacent pages of the bottom magazine therein, longitudinally of said feed means to first engage said pick member with the binding of the magazine and then move said magazine longitudinally of the feed means to the magazine transferring means, and laterally relative to said magazine transferring means to withdraw said pick member from the magazine, and means for adjusting the spacing between said pick member and the bottom of said feed means with said pick member moved laterally into said feed means to thereby vary the location at which said pick member is inserted into the bottom magazine in said feed means.

15. Magazine counting and destroying apparatus or the like, comprising: feed means for the magazines to be counted and destroyed, said feed means being adapted to receive a pile of the magazines to be counted and destroyed therein; means for severing coupons from the covers of said magazines; means for separating the severed coupons from the magazines; means for registering the number of coupons separated from the magazines; means for so mutilating the magazines from which the coupons have been severed as to make said magazines essentially unreadable; means for automatically removing magazines from said feed means and transferring said magazines seriatim to said coupon severing means, the means for separating the severed coupons from the magazines, and the means for mutilating the magazines, the means for removing the magazines from said feed means including a pick member oriented laterally relative to said feed means and means for sequentially moving said pick member to a position adjacent said feed means and opposite the bottom magazine therein, laterally into said feed means and between adjacent pages of the bottom magazine therein, longitudinally of said feed means to first engage said pick member with the binding of the magazine and then move said magazine longitudinally of the feed means to the magazine transferring means, and laterally relative to said magazine transferring means to withdraw said pick member from the magazine; and suction means in the bottom of said feed means for maintaining the bottom magazine therein in a fixed position while the pick member is inserted into said magazine.

16. The apparatus of claim 15, wherein said feed means has a door member in the bottom thereof adapted to be opened coincident with the removal of a magazine from the feed means and means biasing said door member to the closed position.

17. The apparatus of claim 15, together with guide member for laterally positioning magazines removed from said feed means on the magazine transferring means.

References Cited

UNITED STATES PATENTS 2,618,334 11/1952 Cobb.
3,234,833 2/1966 Gilbert _____ 83—417 X JAMES M. MEISTER, *Primary Examiner.*

U.S. Cl. X.R.

83—152, 407, 417, 522, 925